Sept. 24, 1974    N. W. J. PUMPHREY    3,838,035
MECURY CELL WITH COATED ANODE
Filed March 1, 1973    2 Sheets-Sheet 2

United States Patent Office 3,838,035
Patented Sept. 24, 1974

3,838,035
MERCURY CELL WITH COATED ANODE
Nicholas William James Pumphrey, Runcorn, Cheshire, England, assignor to Imperial Chemical Industries Limited, London, England
Filed Mar. 1, 1973, Ser. No. 337,204
Claims priority, application Great Britain, Mar. 9, 1972, 10,949/72
Int. Cl. B01k 3/06; C01b 7/06
U.S. Cl. 204—250
18 Claims

ABSTRACT OF THE DISCLOSURE

An anode for a mercury cell is provided with a perforated current distributor carrying on its upward facing surface an electro-catalytically active coating which is protected from contact by mercury, thereby reducing the incidence of short-circuiting in the cell.

---

Figure 1:
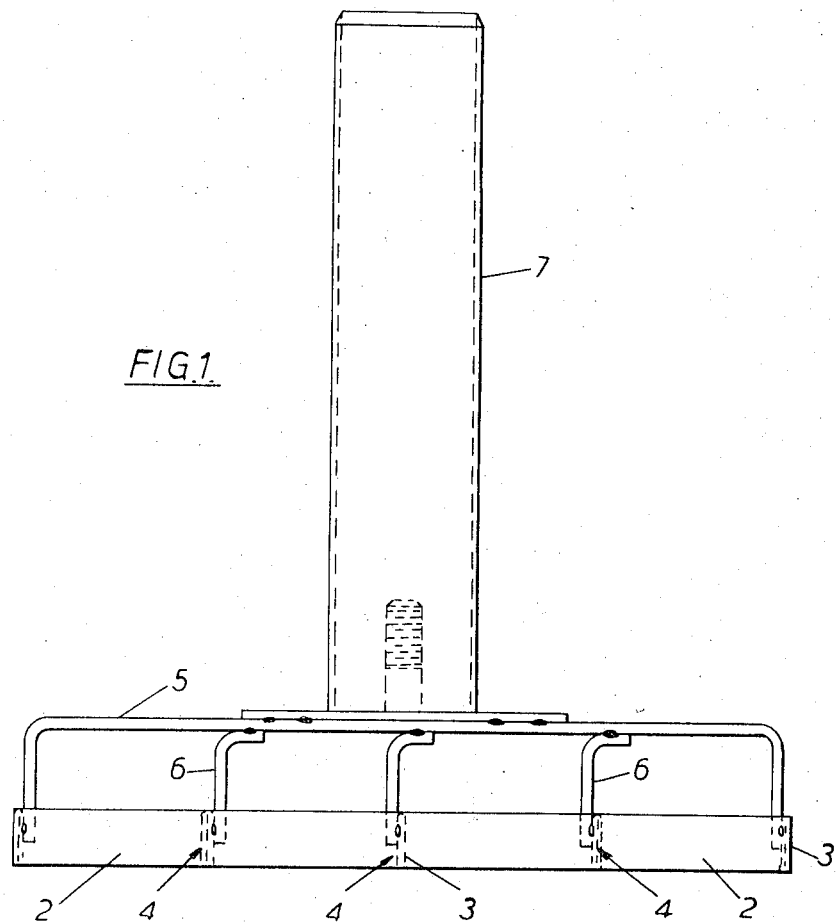

This invention relates to electrodes for electrochemical processes.

More particularly, it relates to electrodes made of a film-forming metal and carrying an electro-catalytically active coating.

Such electrodes are advantageously employed as anodes in cells for the electrolysis of alkali-metal chloride solutions, the anode being made of a film-forming metal, usually titanium, and carrying a conductive coating which is resistant to electrochemical attack but is active in transferring electrons between the electrolyte and the anode.

The electro-catalytically active material of the conductive coating may suitably consist of one or more of the platinum group metals or their oxides, particularly ruthenium oxide, and in order to anchor this material more securely to the electrode it may be deposited on the electrode in admixture with an oxide of a film-forming metal, e.g. titanium dioxide, to form the coating. Platinum group metals and their conducting compounds, particularly oxides, are readily produced by thermal decomposition techniques, as described for example in U.K. Pats. Nos. 1,147,-442; 1,195,871; 1,206,863 and 1,244,650.

Coatings comprising a platinum group metal oxide exhibit high catalytic activity in chloride electrolytes, i.e. they have a low over-potential for the liberation of chlorine. The loss of the expensive platinum group metal from the coatings is also advantageously low under normal conditions of operation, even when the electrodes are used as anodes in mercury-cathode cells.

Unfortunately however, the coatings are not entirely resistant to damage by short-circuit contact with a mercury cathode and, since accidental short-circuiting cannot always be avoided, reduced life-times for the electrode coatings can be experienced in mercury-cathode cells.

An object of the present invention is to provide an improved electrode of the aforesaid type whereby the incidence of short-circuiting to a mercury cathode is considerably reduced or eliminated.

A further object of the present invention is to provide an improved electrode which enables the electrolysis path to be reduced to a minimum thereby considerably improving the economic efficiency of the cell.

According to the present invention there is provided an electrode comprising a foraminous current distributor carried by a support member which is adapted for mounting in a mercury cell, said current distributor and said support member being made of a film-forming metal or alloy thereof, the current distributor having an electro-catalytically active coating on a surface which is remote from the mercury cathode when the electrode is installed in the cell, said current distributor also being provided with means for preventing access of mercury to the coating during operation of the cell.

In this specification by "a film-forming metal" we mean one of the metals titanium, zirconium, niobium, tantalum and tungsten or alloys thereof.

Preferably, the support member and the current distributor are made of titanium or an alloy based on titanium and having anodic polarisation properties similar to those of titanium.

Further preferably, the foraminous current distributor comprises a woven gauze, drilled plate or expanded sheet.

By "expanded" is meant a panel of metal which is slotted and stretched to give a perforated gauze-type sheet.

The perforations of the foraminous current distributor should be small enough to prevent mercury from the cathode penetrating through onto the electro-catalytically active coating.

The electro-catalytically active coating preferably comprises at least one platinum group metal or an oxide thereof and an oxide of a film-forming metal.

By a "platinum group metal" is meant one of the metals platinum, rhodium, iridium, ruthenium, osmium and palladium.

A conventional electrode of the type with which this invention is concerned comprises a current distributor in the form of a grid plate consisting of a plurality of spaced-apart titanium blades or rods and a support member in the form of an inverted U-shaped conductor bridge mounted across and in contact with the grid plate so as to provide electrical connection between adjacent blades or rods of the grid plate and an upright hollow cylindrical titanium tube or tup mounted centrally on the conductor bridge plate in a plane at right angles to the plate, a copper or aluminium conductor member being rigidly inserted within the cylindrical tube or tup in known manner to effect electrical connection with the bridge plate.

In the electrode of the present invention the current distributor may be formed by attaching a foraminous sheet of the film-forming metal onto a grid comprising a plurality of parallel spaced apart blades or rods of the film-forming metal which may be fewer in number than the blades or rods constituting the grid plate of the above-described conventional electrode and which serve simply as supports for the foraminous sheet.

An alternative method of manufacturing the current distributor is to employ powder metallurgy techniques in which a support grid is formed by pressing a powder of the film-forming metal into the desired shape and then sintering a foraminous sheet of the film-forming metal onto the support grid.

The foraminous sheet of the film-forming metal has previously been coated on its upper surface with the electro-catalytically active material and provided with an upwardly extending peripheral collar which serves to prevent access of mercury to the conductive coating.

In a preferred embodiment of the invention the current distributor comprises a foraminous sheet of the film-forming metal attached to a frame made of the film-forming metal, said frame serving as a peripheral collar for the foraminous sheet.

The current distributor advantageously comprises a plurality of said frames joined together.

In yet another embodiment of the invention the current distributor comprises a foraminous sheet with its edges folded over at right angles to the plane of the sheet to provide a peripheral collar for the sheet.

The current distributor may consist of a plurality of said collared sheets joined together.

The foraminous sheet preferably is a titanium gauze.

During operation of the cell, the uncoated underside of the titanium gauze, which carries only a natural titanium dioxide film, may be allowed to contact the mercury cathode. In the first few seconds of operation of the cell the titanium dioxide coating thickens due to anodic oxidation until it will not accept any current and thereafter serves as an insulator. This insulating layer may be made more durable by applying to the underside of the gauze a paint which when fired leaves a layer of pure titanium dioxide. A plurality of such coats may be applied to the underside.

The diameter of the perforations of the gauze is important and must be small enough to prevent the mercury from penetrating the gauze and contacting the conductive coating. If the largest dimension of the perforations is kept below 0.75 mm., preferably 0.5 to 0.25 mm., the mercury will not penetrate through the gauze because its surface tension is too high.

In certain circumstances mercury penetration of the gauze may occur. However in such a situation a bead of mercury will form on the electro-catalytically active coating and will not be in contact with the bulk of the mercury cathode and so short circuiting will still be avoided. To accommodate this possibility of beads forming on the conductive coating, the trailing edge of the gauze in the direction of mercury flow may be left without an upwardly extending collar so that any beads of mercury which form can be drawn away into the mercury cathode.

The peripheral protective collar of the gauze must be of a height such as to prevent mercury from contacting the conductive coating on the upper surface of the gauze. In theory a collar height of 4 mm. would be satisfactory but in practice this may have to be higher to impart the desired mechanical rigidity to the gauze.

The electrode of the invention considerably reduces or eliminates short-circuiting due to the fact that the mercury is prevented from contacting the conductive coating on the gauze.

Another advantage of the present invention is that the cell can be operated with the electrode grid plate in contact with the surface of the mercury. This in effect reduces the electrolysis path to a minimum and results in greatly increased efficiency since the nearer the anode is to the mercury the greater is the financial saving.

A further advantage of the invention is the excellent gas release from the upward facing electro-catalytically active surface, formation of bubble layers between the active surface of the anode and the mercury cathode being eliminated.

Yet another advantage of the present invention results from the fact that the titanium gauze is easily replaced. In the electrode structure of the invention the tup, conductor bridge and titanium support bars can be regarded as permanent components and the comparatively cheap titanium gauze can be replaced after the conductive coating wears out. The gauze can be stripped off and a new gauze welded onto the support bars so that reconditioning of the electrode becomes a simple matter.

The coating of the electrodes of the invention is preferably effected by the known painting and firing technique, wherein a coating comprising a platinum group metal oxide and a film-forming metal oxide is deposited on a film-forming metal support by applying a paint composition containing thermally-decomposable compounds of a platinum group metal to a chemically-cleaned surface of the support member, evaporating the paint vehicle and heating the coated support in an oxidising atmosphere to remove the remaining organic constitutents of the paint and form the desired oxide coating. A thicker coating for increased life in industrial practice is preferably built up by applying a plurality of paint layers on the support member, each layer being dried and fired before applying the next layer.

Suitable thermally decomposable compounds of the platinum group metals for use in the aforesaid paint compositions are the halides and halo-acid complexes of the platinum group metals, e.g. $RuCl_3$, $RhCl_3$, $H_2PtCl_6$, $H_2IrCl_6$, and organo-compounds of the platinum group metals, e.g. resinates and alkoxides of these metals. Suitable thermally decomposable compounds of the film-forming metals are alkoxides, alkoxy-halides in which the halogen is chlorine, bromine or fluorine and resinates of these metals. Most preferred, especially when the electrode support member that is to be coated consists of titanium or a titanium alloy, are the alkyl orthotitanates, partially condensed (hydrolysed) derivatives of these, which are usually referred to as alkyl polytitanates, and alkyl halotitanates wherein the halogen is chlorine, bromine or fluorine, especially those compounds of these classes wherein the alkyl groups contain two to four carbon atoms each.

The paint composition is made by dissolving or dispersing the platinum group metal compound or compounds and the film-forming metal compound in an organic liquid vehicle, preferably a lower alkanol, e.g. an alkanol containing two to six carbon atoms per molecule. Optionally a reducing agent, e.g. linalool, may be included in the paint composition.

The coating of the finished electrode should contain 5% to 65% of platinum group metal oxides (preferably 30% to 50%) calculated on the total weight of platinum group metal oxides and film-forming metal oxide. Up to 50% by weight of the mixture of platinum group metal oxide and film-forming metal oxide can be replaced by one or more of tin dioxide, germanium dioxide and oxides of antimony.

Figure 2:
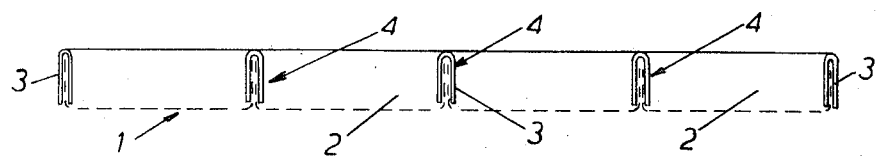
Figure 3:
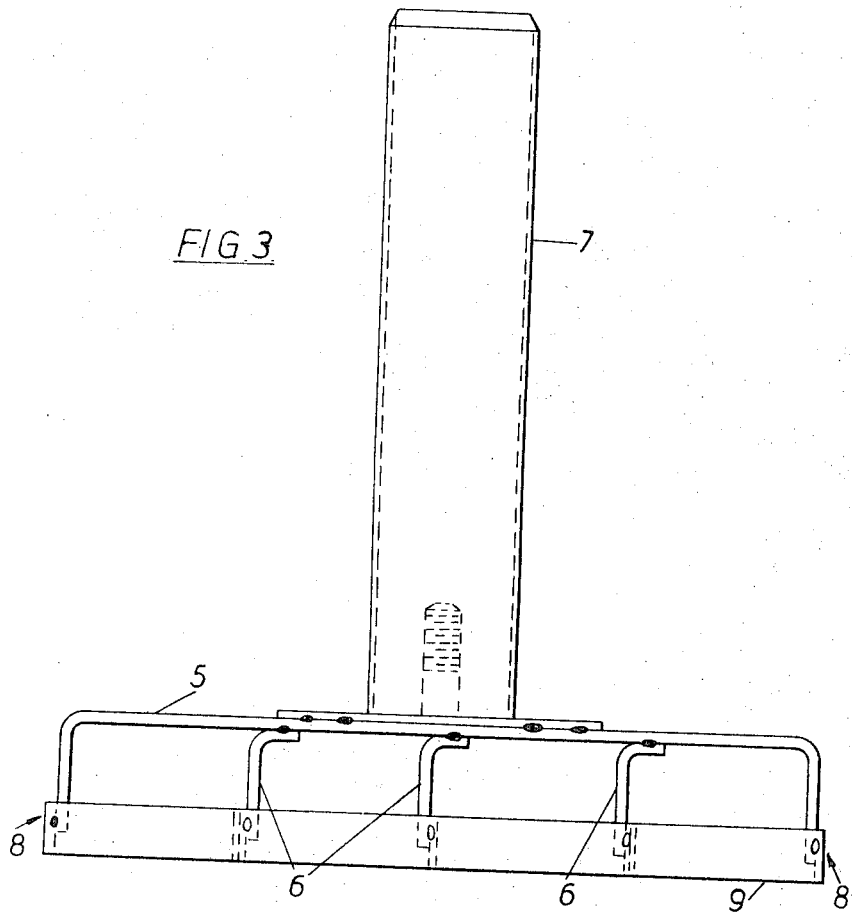
Figure 4:
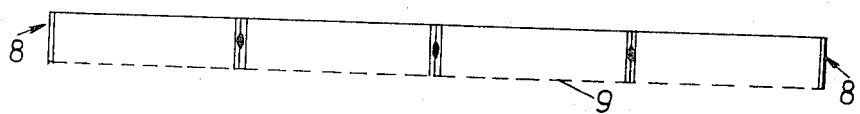

Embodiments of the invention will now be described, simply by way of example, with reference to the accompanying drawings, in which, FIG. 1 is an elevation of an electrode according to the invention, FIG. 2 is a sectional elevation of the current distributor of the electrode of FIG. 1 shown in greater detail, FIG. 3 is an elevation of another embodiment of the electrode according to the invention, and FIG. 4 is a sectional elevation of the current distributor of FIG. 3 shown in more detail.

EXAMPLE 1

Referring to FIGS. 1 and 2 of the drawings an anode compatible with present mercury cell design was constructed as follows. An expanded titanium sheet was folded to form an elongated rectangular trough 1 having a peripheral collar consisting of four vertical sides 2 each side being ½" high. Four such troughs 1 were grouped together to form a current distributor. Titanium strips 3 of length corresponding to that of the respective longitudinal and transverse sides 2 were folded down their centre lines. These folded strips 3 were fitted over the upstanding sides 2 of the troughs 1. Where two upstanding longitudinal sides of the trough were pressed together one strip 3 was fitted over both of said adjacent sides so that the troughs 1 were held together. Spot welds were made through the folded strips so that the upstanding sides 2 were gripped tightly to provide an efficient electrical contact. At the corners of the troughs 1 the longitudinal and transverse sides 2 were seam welded to form a rigid current distributor with five equally spaced reinforcing bars 4. A titanium bridge 5 of inverted U-shape and fitted with additional depending members 6 was welded to the centre of the sides 2 and reinforcing bars 4 of the current distributor. A current lead-in protection tube 7 of titanium had previously been fitted to the cross-member of the bridge 5. The structure was stress relieved by annealing at 475° C. for 1½ hours. The titanium dioxide layer was removed by etching in 10% oxalic acid at 90° C. for about 1 hour. The upper surface of the current distributor was coated with a mixed oxide coating containing ruthenium and titanium oxides. The lower surface of the current distributor was coated with an insulating layer of pure titanium dioxide.

An anode thus constructed electrolyses brine with small power losses in solution whether or not the lower surface of the current distributor is in contact with the mercury cathode.

EXAMPLE 2

An anode compatible with present mercury cell design was constructed as indicated in FIGS. 3 and 4. A strip of titanium was folded to form an open rectangular frame 8⅝" high. A sheet of expanded titanium 9 was welded, using a micro plasma arc, to the underside of the rectangular frame 8. Four such rectangular frames 8 were fitted together to form a current distributor, the longitudinal sides of adjacent frames being spot welded together so that the distributor formed a rigid structure. A support member in the form of an inverted-U bridge 5 fitted with a current lead-in rod protection tube 7 was welded to the longitudinal sides of the current distributor frames 8, each limb of the bridge 5 and additional depending members 6 being welded to juxtapositioned longitudinal sides of the frames 8. The rod protection tube 7, the bridge 5 and depending members 6 are also made of titanium. The whole structure was stress relieved, cleaned and coated as described in Example 1.

An anode constructed in the above manner electrolyses brine with small proved loss in solution whether or not its lower surface of the current distributor is in contact with the mercury cathode.

EXAMPLE 3

A test anode (not illustrated) for the electrolysis of brine in a mercury cell was constructed as follows:

1 mm. LW expanded metal titanium 0.005 inch thick and 1 inch square was sprayed with paint which when fired converted to a layer of $RuO_2$:$TiO_2$ mixed crystals. This oxide layer was present only on one side of the expanded metal sheet. Three coats of the paint were applied. The sheet was then clamped to an electrical head and arranged level 2 mm. above a flowing mercury cathode, with the painted side uppermost. The lower side of the anode gauze was electrically insulated by the pure $TiO_2$ oxide layer. A voltage of 4.1 volts was applied and the sample electrolysed at a current of 1.0 amp/cm.$^2$. (Conventional anodes would have a current density of 0.8 amp/cm.$^2$ at this voltage.) The mercury level was then raised till it touched the lower side of the titanium gauze. No shorting current passed because the lower side of the gauze was insulated but the electrolysis current rose to 2.2 amps/cm.$^2$. Because the holes in the anode were too small for mercury to penetrate readily the anode could be lowered till it was 2 mm. below the level of the mercury. The current stayed approximately constant during this treatment at 2.2 amps/cm.$^2$.

The anode is designed to run in contact with the mercury surface but only discharges chlorine on its upper surface thereby achieving perfect bubble release and avoiding a layer of stagnant brine close to the mercury surface. The anode need not be adjusted very accurately because it runs at constant current over a range of heights relative to the mercury surface. There is no possibility of the anode shorting because mercury cannot get through the gauze to the electrolytically active surface of the anode. At a set voltage the anode runs at a higher current density resulting therefore in less ohmic loss in solution.

What we claim is:

1. An electrode comprising a foraminous current distributor carried by a support member which is adapted for mounting in a mercury cell, said current distributor and said support member being made of a film-forming metal or alloy thereof, the current distributor having two opposed surfaces, one of said surfaces being insulated and being adapted to face the mercury cathode when the electrode is installed in the cell while the other surface faces away from the mercury cathode when the electrode is installed in the cell and has an electro-catalytically active coating thereon, said current distributor also being provided with means for preventing access of mercury to the coating during operation of the cell.

2. An electrode as claimed in claim 1 wherein the support member and the current distributor are made of titanium or an alloy based on titanium and having anodic polarisation properties similar to those of titanium.

3. An electrode as claimed in claim 2 wherein the foraminous current distributor comprises a woven gauze, drilled plate or expanded sheet.

4. An electrode as claimed in claim 3 wherein the perforations of the foraminous current distributor are small enough to prevent mercury from the cathode penetrating through onto the electro-catalytically active coating.

5. An electrode as claimed in claim 4 wherein the largest dimension of the perforations does not exceed 0.75 mm.

6. An electrode as claimed in claim 5 wherein the largest dimension of the perforations is between 0.25 to 0.5 mm.

7. An electrode as claimed in claim 6 wherein the foraminous current distributor is provided with a peripheral collar of sufficient height to prevent access of mercury to the electro-catalytically active coating during operation of the cell.

8. An electrode as claimed in claim 1 wherein the peripheral collar does not extend to the trailing edge of the foraminous current distributor in the director of mercury flow.

9. An electrode as claimed in claim 1 wherein the current distributor comprises a foraminous sheet of the film-forming metal attached to a support grid comprising a plurality of parallel spaced apart blades or rods of the film-forming metal.

10. An electrode as claimed in claim 1 wherein the current distributor comprises a support grid formed by pressing a powder of the film-forming metal into the desired shape and onto which is sintered a foraminous sheet of the film-forming metal.

11. An electrode as claimed in claim 1 wherein the current distributor comprises a foraminous sheet of the film-forming metal attached to a frame made of the film-forming metal, said frame serving as a peripheral collar for the foraminous sheet.

12. An electrode as claimed in claim 11 wherein the current distributor comprises a plurality of said frames joined together.

13. An electrode as claimed in claim 1 wherein the current distributor comprises a foraminous sheet with its edges folded over at right angles to the plane of the sheet to provide a peripheral collar for the sheet.

14. An electrode as claimed in claim 13 wherein the current distributor comprises a plurality of said collared sheets joined together.

15. An electrode as claimed in claim 1 wherein the electro-catalytically active coating comprises at least one platinum group metal or an oxide of a platinum group metal and an oxide of a film-forming metal.

16. An electrode as claimed in claim 15 wherein the surface of the current distributor adjacent to the mercury cathode is coated with an insulating layer of a film-forming metal oxide.

17. A mercury cell comprising a mercury cathode and an anode operatively associated therewith, said anode comprising a foraminous current distributor carried by a support member which is adapted for mounting in a mercury cell, said current distributor and said support member being made of a film-forming metal or alloy thereof, the current distributor having two opposed surfaces, one of said surfaces being insulated and being adapted to face the mercury cathode when the electrode is installed in the cell while the other surface faces away from the mercury cathode when the electrode is installed in the cell and has an electro-catalytically active coating thereon, said current distributor also being provided with means for preventing access of mercury to the coating during operation of the cell whereby short-circuiting between the cathode and anode is reduced.

18. A cell according to claim 17 wherein the mercury cathode is directly beneath the anode and the insulating surface of the current distributor is in contact with the cathode while the coating on the other surface of the distributor is protected from such contact.

References Cited

UNITED STATES PATENTS

| | | | |
|---|---|---|---|
| 3,022,244 | 2/1962 | Le Blanc et al. | 204—266 |
| 3,055,821 | 9/1962 | Holmes et al. | 204—270 |
| 3,458,423 | 7/1969 | Csizi | 204—219 |
| 3,616,445 | 10/1971 | Bianchi et al. | 204—290 F |

FOREIGN PATENTS

| | | | |
|---|---|---|---|
| 1,147,442 | 4/1969 | Great Britain | 204—290 F |
| 1,225,618 | 9/1966 | Germany. | |

FREDERICK C. EDMUNDSON, Primary Examiner

U.S. Cl. X.R.

204—128, 219, 286, 290 F